(12) United States Patent
Olsen (10) Patent No.: US 9,127,758 B2
(45) Date of Patent: Sep. 8, 2015

(54) ANGLED MOUNTING PLATE FOR TORQUE CONVERTER ASSEMBLY

(75) Inventor: Steven Olsen, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 817 days.

(21) Appl. No.: 13/397,037

(22) Filed: Feb. 15, 2012

(65) Prior Publication Data

US 2012/0210706 A1 Aug. 23, 2012

Related U.S. Application Data

(60) Provisional application No. 61/445,359, filed on Feb. 22, 2011.

(51) Int. Cl.
*F16H 41/24* (2006.01)
*F16D 33/00* (2006.01)
*F16H 45/02* (2006.01)

(52) U.S. Cl.
CPC ........ *F16H 41/24* (2013.01); *F16H 2045/0205* (2013.01); *F16H 2045/0221* (2013.01); *F16H 2045/0278* (2013.01)

(58) Field of Classification Search
CPC .......................... F16H 41/24; F16H 2045/0205
USPC ...................................... 416/197 C, 179, 180
See application file for complete search history.

(56) References Cited

U.S. PATENT DOCUMENTS

2008/0096674 A1 4/2008 Pueschel et al.
2010/0322742 A1* 12/2010 Bauer et al. ................... 411/501

FOREIGN PATENT DOCUMENTS

EP 1347210 9/2003

* cited by examiner

*Primary Examiner* — Edward Look
*Assistant Examiner* — Daniel Collins
(74) *Attorney, Agent, or Firm* — Simpson & Simpson, PLLC

(57) ABSTRACT

A torque converter, including a front cover with an exterior surface at least partially facing in a direction parallel to an axis of rotation for the torque converter, and a portion at a furthest radial distance from the axis of rotation. The torque converter also includes: at least one angled mounting plate fixedly connected to the exterior surface of the front cover and including a portion disposed at an acute angle with respect to the axis of rotation; and at least one threaded fastener with: a first end fixedly connected to the portion of the at least one angled mounting plate; and a second end, opposite the first end, disposed further in the direction than the first end, disposed radially outward from the first end, and at a radial distance from the axis of ration less than the furthest radial distance for the front cover.

14 Claims, 7 Drawing Sheets

ANGLED MOUNTING PLATE FOR TORQUE CONVERTER ASSEMBLY

CROSS-REFERENCE TO RELATED APPLICATIONS

This application claims the benefit under 35 U.S.C. §119 (e) of U.S. Provisional Patent Application No. 61/445,359 filed Feb. 22, 2011.

FIELD OF THE INVENTION

The present disclosure related to an angled mounting plate for a torque converter to enable non-axially oriented fastening of the torque converter to a drive unit.

BACKGROUND OF THE INVENTION

European Patent EP 1 347 210 A1 teaches one or more components welded to an exterior surface of a torque converter cover. The components include respective openings through which fasteners are passed for connection to a drive transmitting device. In one version, the angle of the openings is such that fasteners can only be passed from the direction of the torque converter toward the drive transmitting device and angling downward toward the drive transmitting device. For example, as seen in FIGS. 1 and 5 of EP 1 347 210 A1, the invention is only suitable for its intended purpose if the fasteners are oriented toward the drive transmitting device as described above. For example, the respective drive transmitting devices completely block access from any other direction, for example, from the drive transmitting device toward the torque converter.

In another version as shown in FIG. 4, European Patent EP 1 347 210 A1 teaches that the angle of the openings is such that fasteners is passed from the direction of the drive transmitting device angling inward toward the torque converter. Respective portions of the fasteners are located radially outside of the outer circumference of the torque converter, resulting in an undesirable increase in the radial dimension for the torque converter and components.

U.S. Published Patent Application 2008/0096674 teaches an arrangement of a component fastened to a cover for a torque converter and having openings through which fasteners are passed for connection to a drive transmitting device. The angle of the openings is such that fasteners can only be passed from the direction of the torque converter toward the drive transmitting device and angling downward toward the drive transmitting device. Thus, the invention is only suitable for its intended purpose if the fasteners are oriented toward the drive transmitting device as described above.

BRIEF SUMMARY OF THE INVENTION

According to aspects illustrated herein, there is provided a torque converter, including: a front cover with an exterior surface at least partially facing in a direction parallel to an axis of rotation for the torque converter, and a portion at a furthest radial distance from the axis of rotation. The torque converter also includes: at least one angled mounting plate fixedly connected to the exterior surface of the front cover and including a portion disposed at an acute angle with respect to the axis of rotation; and, at least one threaded fastener with: a first end fixedly connected to the portion of the at least one angled mounting plate; and a second end, opposite the first end, disposed further in the direction than the first end and disposed radially outward from the first end. The at least one threaded fastener is entirely located radially inward of the portion of the front cover.

According to aspects illustrated herein, there is provided a torque converter, including: a front cover with: an exterior surface at least partially facing in a direction parallel to an axis of rotation for the torque converter, and a portion at a furthest radial distance from the axis of rotation. The torque converter includes at least one angled mounting plate fixedly connected to the exterior surface of the front cover and including a portion disposed at an acute angle with respect to the axis of rotation; and at least one nut fixedly connected to the portion of the at least one angled mounting plate; or at least one female threaded opening in the at least one angled mounting plate. Respective axes for the at least one nut and the at least one female threaded opening are disposed increasingly radially outward in the direction. The at least one nut and the at least one female threaded opening are located entirely radially inward of the portion of the front cover.

According to aspects illustrated herein, there is provided a torque converter, including: a front cover with: an exterior surface at least partially facing in a direction parallel to an axis of rotation for the torque converter, and a portion at a furthest radial distance from the axis of rotation. The torque converter includes a plurality of threaded fasteners fixed in position with respect to the cover and including: respective first ends; and respective threaded portions terminating in respective second ends opposite the respective first ends. The respective second ends are disposed further in the direction than the respective first ends. The respective second ends are disposed radially outward from the respective first ends. The respective second ends are entirely disposed radially inward of the portion of the front cover.

These and other objects and advantages of the present invention will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
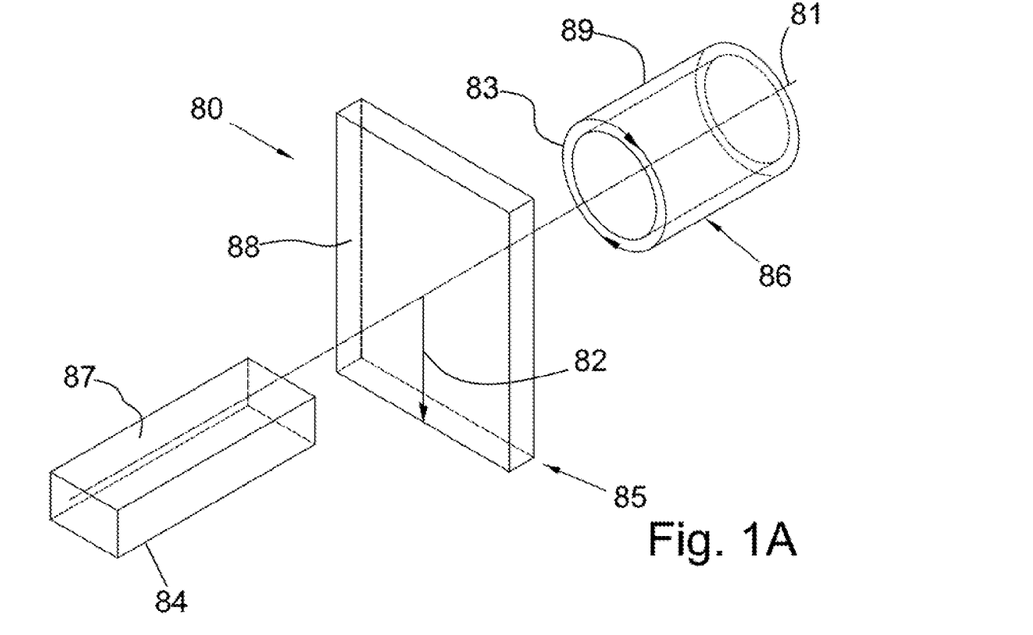
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
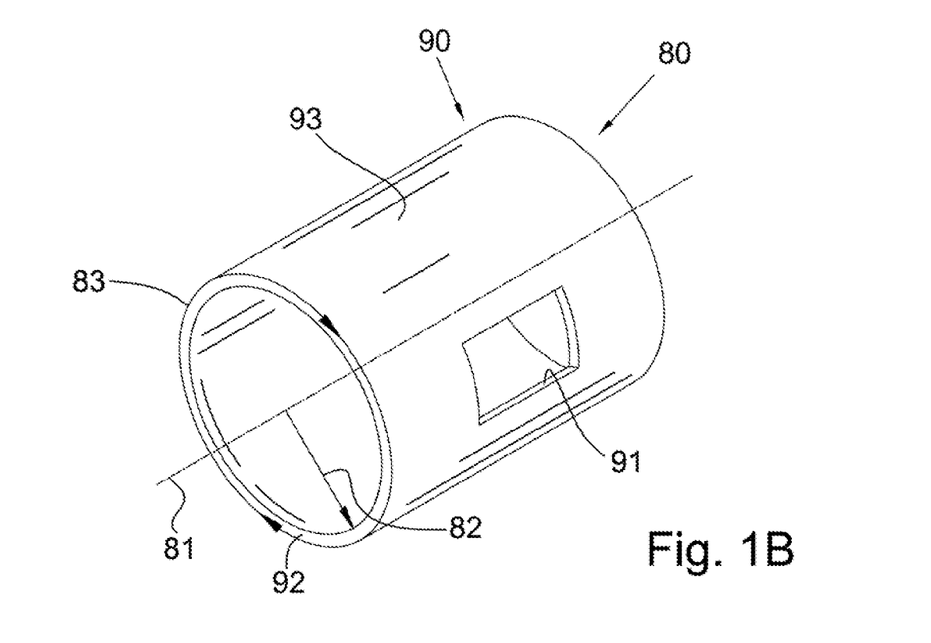
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
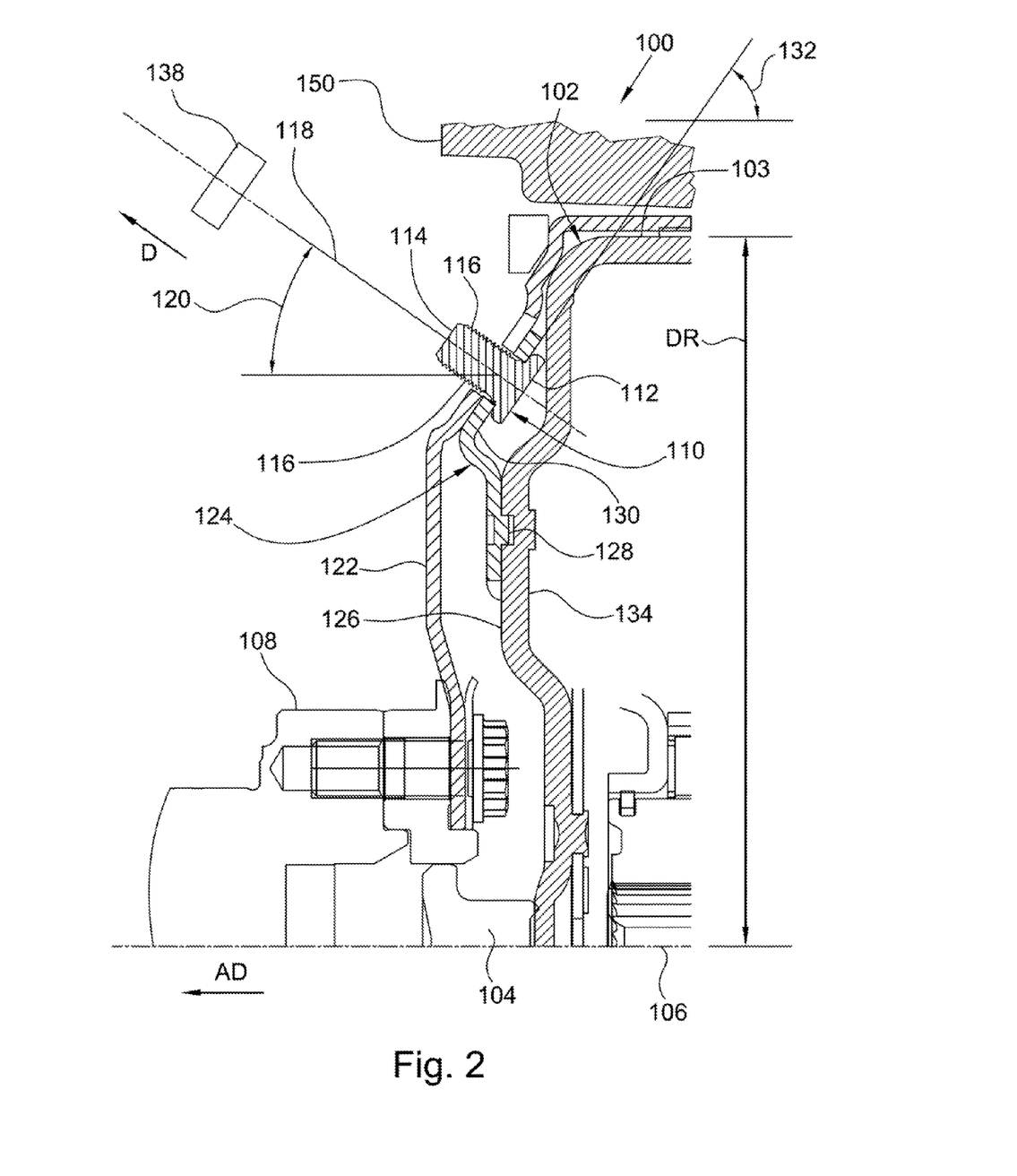
FIG. 2 is a partial cross-sectional view of a torque converter with an angled mounting plate with a threaded fastener.

FIG. 2 is a partial cross-sectional view of torque converter 100 with an angled mounting plate with a threaded fastener.

Figure 3:
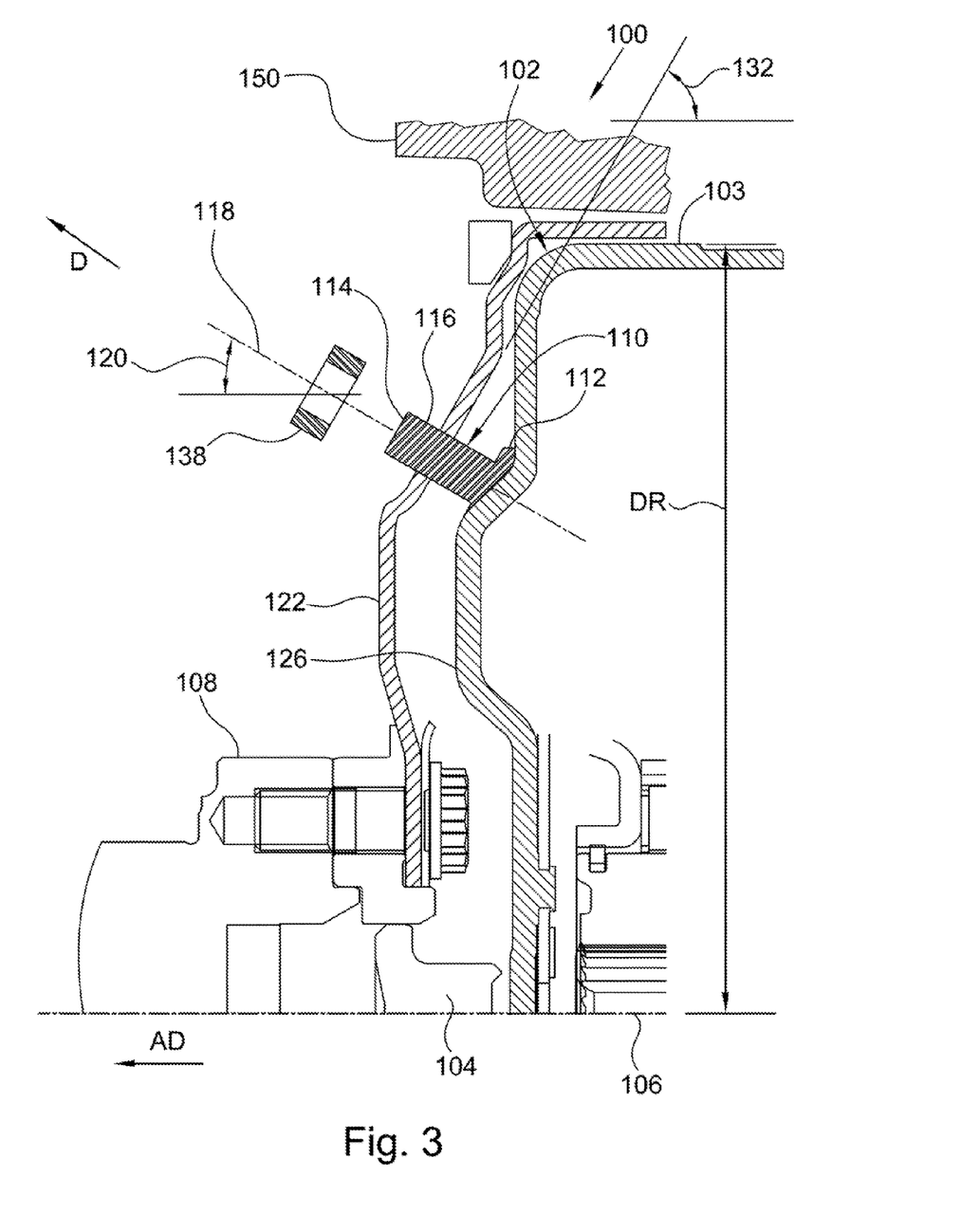
FIG. 3 is a partial cross-sectional view of a torque converter with a threaded fastener fixed to a cover for the torque converter.

FIG. 3 is a partial cross-sectional view of torque converter 100 with a threaded fastener fixed to a cover for the torque converter. The following should be viewed in light of FIGS. 2 and 3. Torque converter 100 includes front cover 102 and pilot element 104. The front cover and the pilot element both face axial direction AD parallel to axis of rotation 106 for the torque converter. AD is in the direction of a drive unit to be connected to the torque converter, for example, in the direction of crankshaft 108. The pilot element is for interfacing with a crankshaft, for example, crankshaft 108. The pilot element and the cover can be separately formed elements or can be formed of a same piece of material. The torque converter also includes a plurality of fasteners 110, for example, threaded fasteners, fixed in position with respect to the torque converter, in particular, with respect to front cover 102 of the torque converter. By "fixed in position" we mean that the fasteners do not move with respect to the front cover.

The fasteners include ends 112 and 114 and threaded portion 116, which terminates at end 114. That is, nut 138 or similar device is threaded onto the fasteners at ends 114. The fasteners are angled up and away from the front cover. For example, end 114 is disposed further in direction AD than end 112 and end 114 is disposed radially outward from end 112. Thus, axis 118 for the fasteners is at acute angle 120 with respect to axis 106 for the torque converter. The plurality of fasteners is for connecting the front cover to a torque transmitting device, for example, flex plate 122 connected to the crankshaft, as further described infra.

In one embodiment, for example, as shown in FIG. 3, fasteners 110 are directly fixed to the front cover by any means known in the art, for example, welding. In one embodiment, for example, as shown in FIG. 2, the torque converter includes at least one angled mounting plate 124 fixedly connected to exterior surface 126 of the front cover by any means known in the art, such as rivet 128, or welding (not shown). In one embodiment, the at least one element 124 is a single annular plate connected to the cover at a plurality of points, for example, by a plurality of rivets 128. In one embodiment, the at least one element 124 is a plurality of separate elements disposed circumferentially about the cover. For example, each element is connected by one or more rivets 128 and each element includes one fastener 110. It should be understood that a separate element 124 can be fastened to the cover by other numbers of rivets and can be connected to other numbers of fasteners 110.

Element 124 includes portion 130 disposed at acute angle 132 with respect to axis 106. In one embodiment, angles 120 and 132 are complementary (the sum of the angles is 90 degrees), and axes 118 are orthogonal to portion 130. Thus, threaded portion 116 of the fastener extends beyond portion 130 in direction D away from the exterior surface of the front cover. That is, axes 118 are not aligned with axis 106. In one embodiment, the front cover includes portion 134 orthogonal to axis 106 and extending furthest in direction AD, and element 124 is fixedly connected to portion 134. In one embodiment, fastener 110 is fixedly connected to element 124 via compressive engagement, for example, the fastener is clinched. In one embodiment, fastener 110 is welded to element 124.

Front cover 102 includes portion 103 at a furthest radial distance DR from axis 106. Fasteners 110 and nuts 138 are entirely disposed radially inward of portion 103. That is, the entirety of fasteners 110 and nuts 138 is less than distance DR from the axis.

Figure 4:
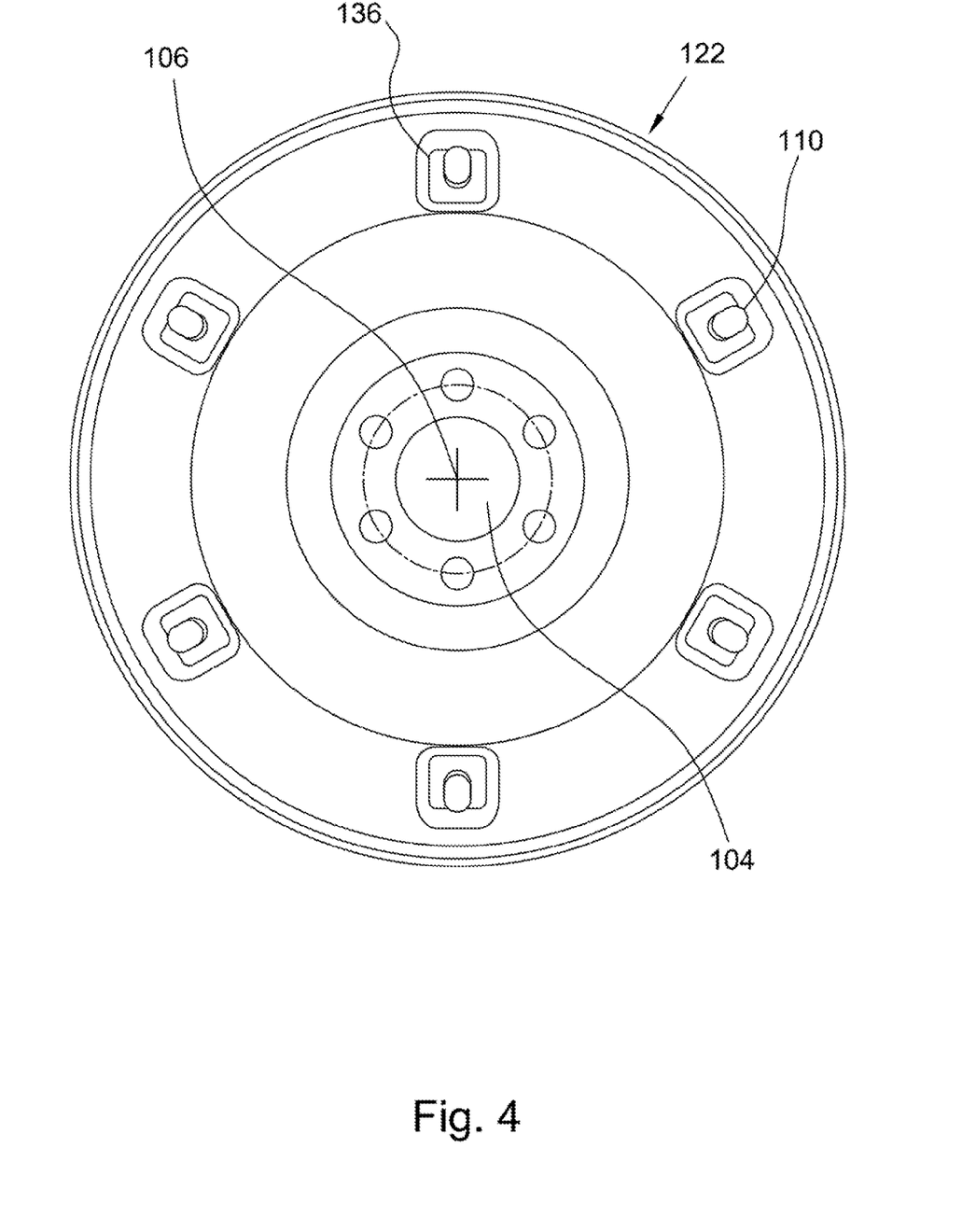
FIG. 4 is a front view of a flex plate usable with the torque converter shown in FIGS. 2 and 3.

FIG. 4 is a partial front view of flex plate 122 usable with the torque converter 100 shown in FIGS. 2 and 3. The flex plate can include oblong shaped slots 136 through which fasteners 110 can be passed. Once the fasteners are passed through the slots, the flex plate and the front cover can be fixed with respect to each other via nuts 138 secured to the fasteners.

Figure 5:
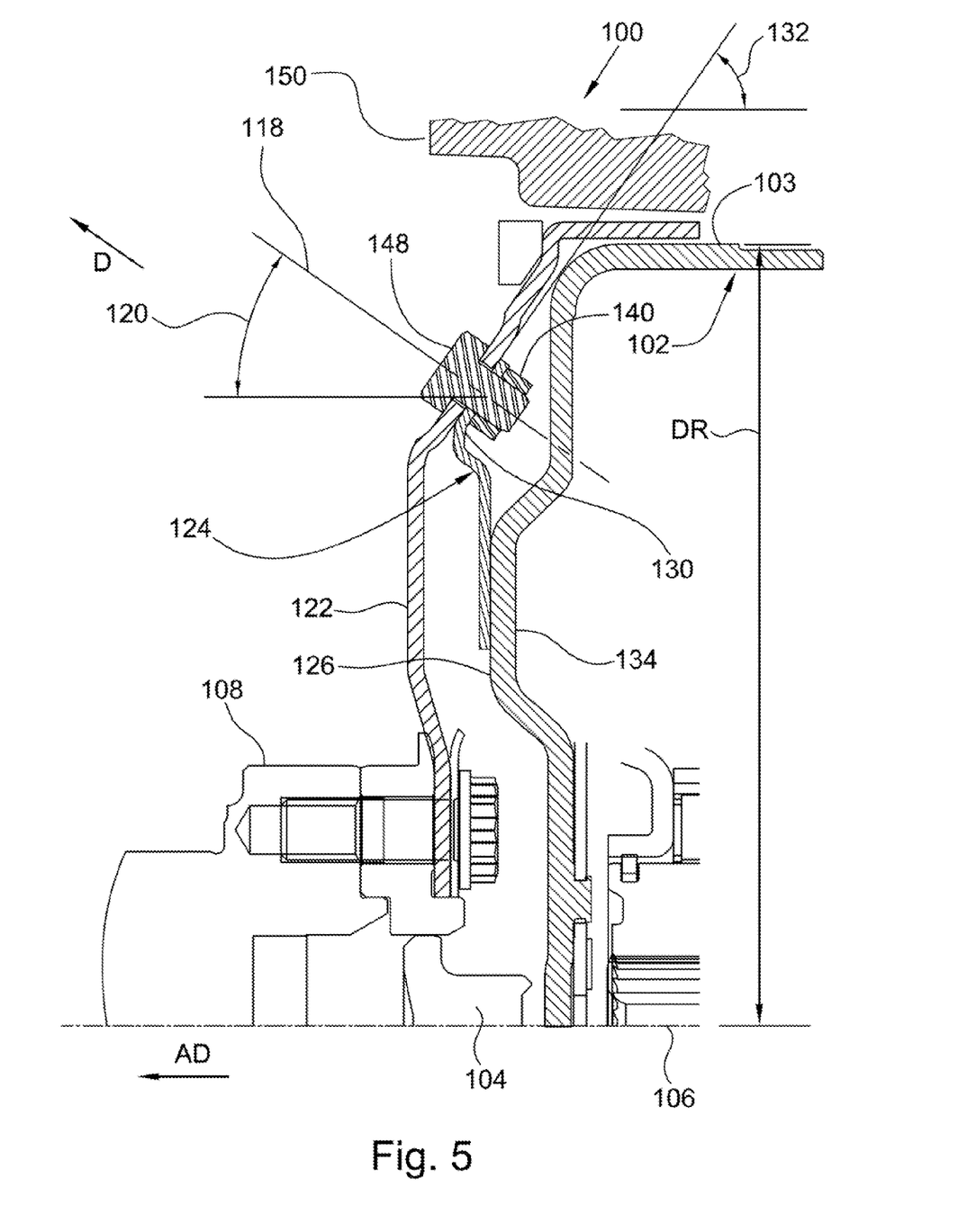
FIG. 5 is a partial cross-sectional view of a torque converter with an angled mounting plate with a nut.

FIG. 5 is a partial cross-sectional view of torque converter with angled mounting plate 124 with a nut.

Figure 6:
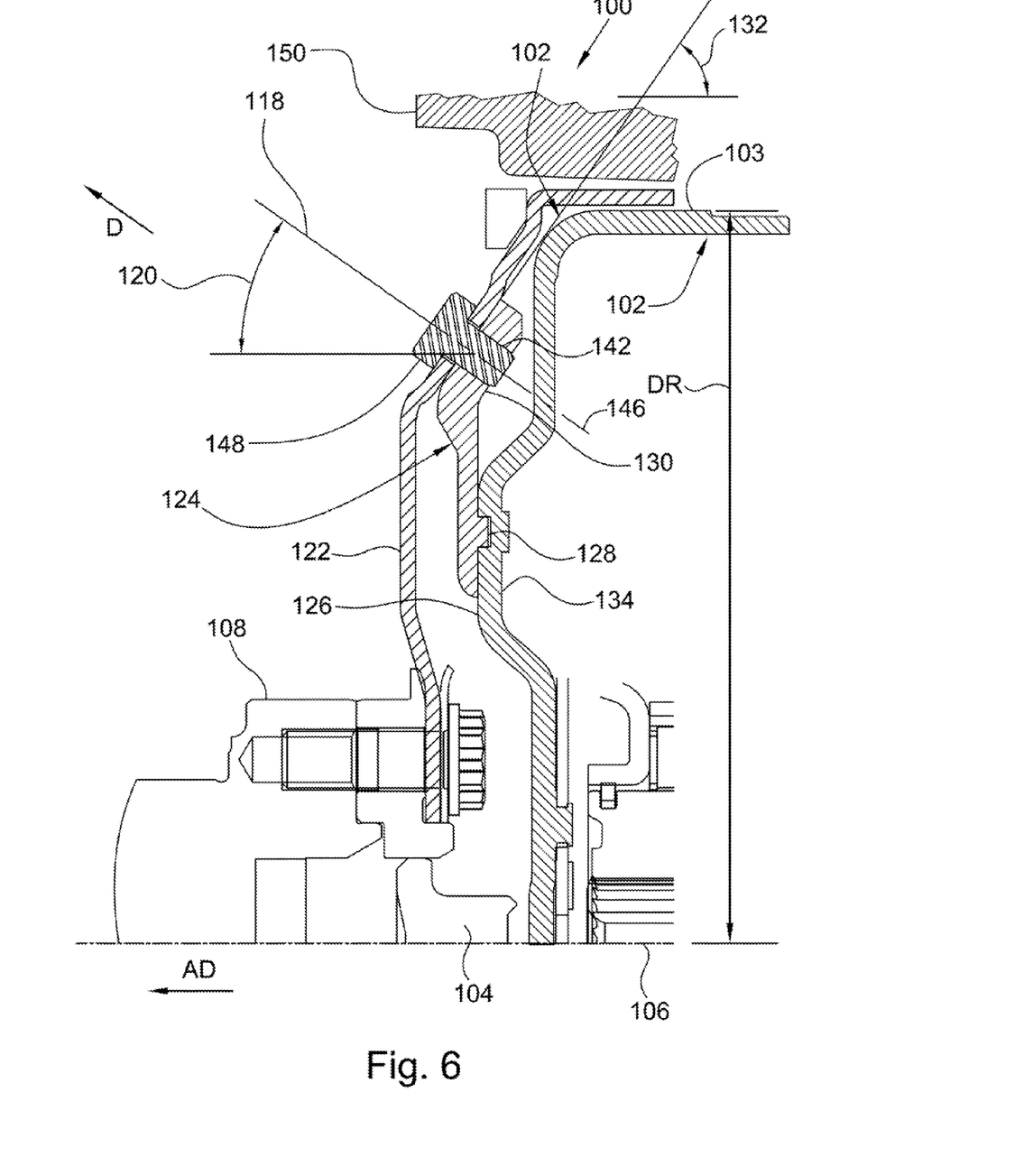
FIG. 6 is a partial cross-sectional view of a torque converter with an angled mounting plate with a lug; and, FIG. 7 is a partial cross-sectional view of the torque converter shown in FIG. 5 without the flex plate and crankshaft and showing further details of the torque converter.

FIG. 6 is a partial cross-sectional view of torque converter 100 with angled mounting plate 124 with a lug. The following should be viewed in light of FIGS. 2, 3, 5 and 6. In one embodiment, the torque converter includes at least one nut 140 fixedly connected to portion 130, as shown in FIG. 5. In FIG. 5, axis 118 is the axis for the nut. In one embodiment, the torque converter includes at least one female threaded opening 142 in element 124, as shown in FIG. 6. For example, openings 142 are formed by lugs built into, or integral to, element 124. That is, the material of element 124 is tapped to form openings 142. In FIG. 6, axis 118 is the axis for the openings. Axes 144 and 146 for nut 140 and opening 142, respectively, are disposed increasingly radially outward in direction AD. That is, a radial distance from axis 106 to axes 144 and 146 increases in direction AD. Nut 140 and opening 142 are for connecting element 124 to flex plate 122. For example, fasteners 148 can be passed through openings in a torque transmitting device, such as flex plate 122, and engaged with the nut or opening 142 to fix the flex plate to element 124.

Front cover 102 includes portion 103 at a furthest radial distance DR from axis 106. Fasteners 148 are entirely disposed radially inward of portion 103. That is, the entirety of fasteners 148 is less than distance DR from the axis.

Figure 7:
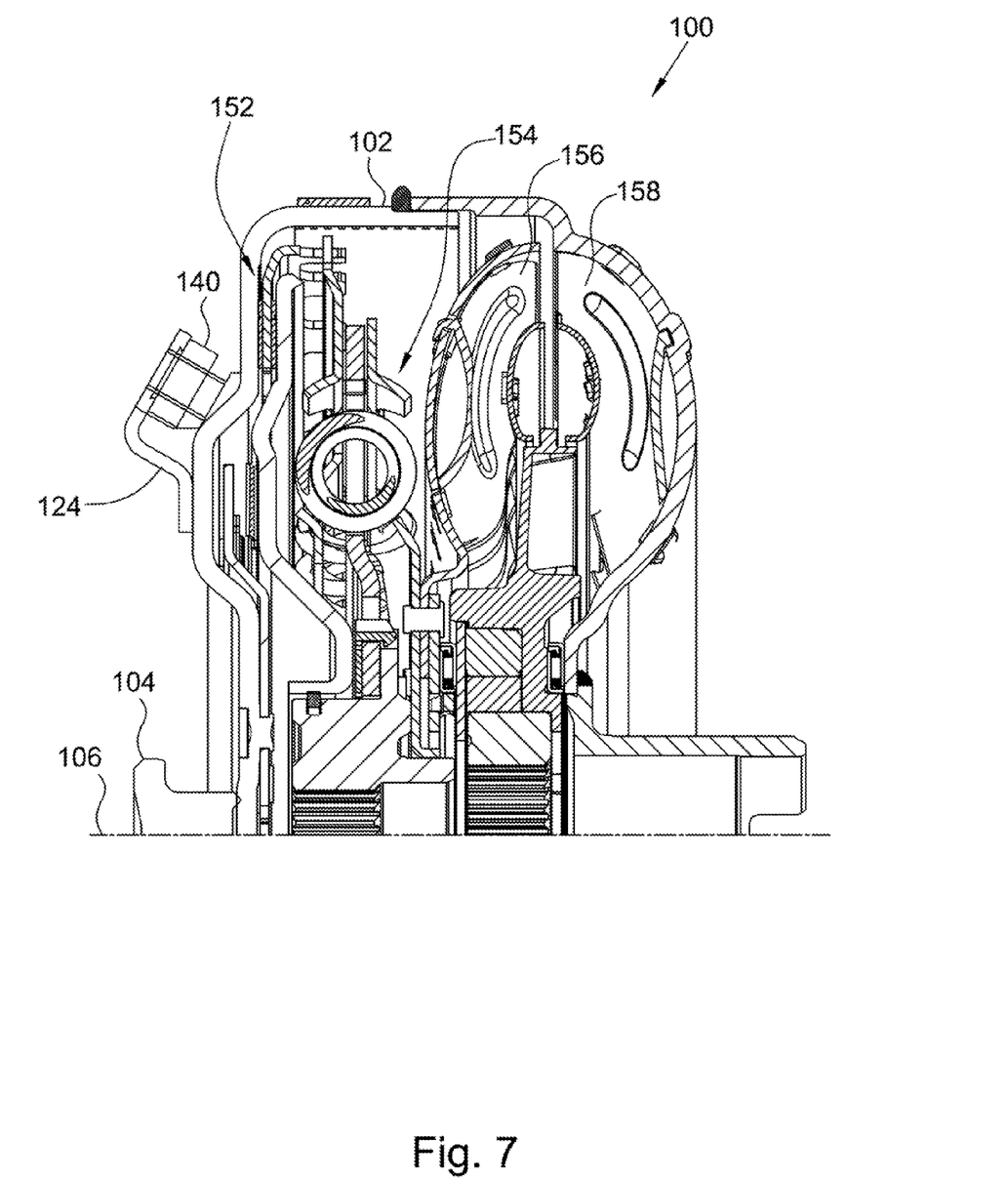

FIG. 7 is a partial cross-sectional view of torque converter 100 shown in FIG. 5 without the flex plate and crankshaft and showing further details of the torque converter. FIG. 7 illustrates examples of possible components of torque converter 100 including, for example, lock-up clutch 152, damper assembly 154, turbine 156, and impeller 158. It should be understood that other combinations of components are possible for torque converter 100.

The following should be viewed in light of FIGS. 2 through 6. The configurations shown in FIGS. 2, 3, 5, and 6 enable connection of torque converter 100 to a flex plate or other torque transmitting device from the direction of the torque transmitting device. For example, in FIGS. 2, 3, 5, and 6, housing 150 precludes access to the torque transmitting device from the direction of the torque converter; however, the orientation of fasteners 110, nuts 140, and openings 142 enable easy access from the torque transmitting device side. Thus, the configurations shown in FIGS. 2, 3, 5, and 6 enable assembly of a torque converter to a torque transmitting device outside of axis 106.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A torque converter, comprising:
a front cover with:
an exterior surface at least partially facing in a direction parallel to an axis of rotation for the torque converter; and
a portion at a furthest radial distance from the axis of rotation;
at least one angled mounting plate fixedly connected to the exterior surface of the front cover and including a portion disposed at an acute angle with respect to the axis of rotation; and,
at least one threaded fastener with:
a first end fixedly connected to the portion of the at least one angled mounting plate;
a second end, opposite the first end, disposed further in the direction than the first end and disposed radially outward from the first end; and,
an axis passing through:
the first and second ends; and,
the front cover, wherein:
the at least one threaded fastener is entirely located radially inward of the portion of the front cover.

2. The torque converter of claim 1 further comprising a pilot element facing in the direction and for interfacing with a crankshaft.

3. The torque converter of claim 1 wherein the at least one threaded fastener is for connecting the at least one angled mounting plate to a flex plate connected to a crankshaft.

4. The torque converter of claim 3 wherein the flex plate includes at least one oblong shaped slot through which the at least one threaded fastener fasteners is passable.

5. The torque converter of claim 1 wherein:
the exterior surface of the front cover includes a portion orthogonal to the axis of rotation and extending furthest in the direction; and,
the at least one angled mounting plate is fixedly connected to the portion of the exterior surface.

6. A torque converter, comprising:
an impeller;
a turbine;
a front cover directly connected to the impeller and with:
an exterior surface at least partially facing in a direction:
parallel to an axis of rotation for the torque converter; and
from the impeller toward the turbine; and
a portion at a furthest radial distance from the axis of rotation;
at least one angled mounting plate fixedly connected to the exterior surface of the front cover and including a portion:
disposed at an acute angle with respect to the axis of rotation; and,
at least one nut fixedly connected to the portion of the at least one angled mounting plate,
wherein:
respective axes for the at least one nut and the at least one female threaded opening are disposed-increasingly radially outward as the respective axes extend in the direction; and,
the at least one nut and the at least one female threaded opening are located entirely radially inward of the portion of the front cover.

7. The torque converter of claim 6 further comprising a pilot element facing in the direction and for interfacing with a crankshaft.

8. The torque converter of claim 6 wherein the at least one nut and the at least one female threaded opening are for connecting the at least one angled mounting plate to a flex plate connected to a crankshaft.

9. The torque converter of claim 8 wherein the flex plate includes a plurality of openings through which fasteners are passable for connection to the at least one nut or the at least one female threaded opening.

10. The torque converter of claim 6 wherein:
the exterior surface of the front cover includes a portion orthogonal to the axis of rotation and extending furthest in the direction; and,
the at least one angled mounting plate is fixedly connected to the portion of the exterior surface.

11. A torque converter, comprising:
a front cover with:
an exterior surface at least partially facing in a direction parallel to an axis of rotation for the torque converter; and a portion at a furthest radial distance from the axis of rotation;
a plurality of threaded fasteners fixed in position with respect to the cover and including:
respective first ends; and,
respective threaded portions terminating in respective second ends opposite the respective first ends, wherein:
the respective first ends are directly welded to the exterior surface of the front cover;
the respective second ends are disposed further in the direction than the respective first ends;
the respective second ends are disposed radially outward from the respective first ends; and,
the respective second ends are entirely disposed radially inward of the portion of the front cover.

12. The torque converter of claim 11 further comprising a pilot element facing in the direction and for interfacing with a crankshaft.

13. The torque converter of claim 11 further comprising at least one angled mounting plate fixedly connected to the exterior surface of the cover, wherein the respective first ends are fixedly connected to the at least one angled mounting plate.

14. The torque converter of claim 11 wherein the at least one nut and the at least one female threaded opening are for connecting the front cover to a flex plate connected to a crankshaft.

* * * * *